(12) United States Patent
Wolford et al.

(10) Patent No.: US 6,782,917 B2
(45) Date of Patent: Aug. 31, 2004

(54) RECIPROCATING CONE ANTI-DRAINBACK APPARATUS

(75) Inventors: James B. Wolford, Chicago, IL (US); Joseph A. Geisler, Des Plaines, IL (US); Mitchell Kujawski, Des Plaines, IL (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/983,321

(22) Filed: Oct. 24, 2001

(65) Prior Publication Data

US 2003/0075496 A1 Apr. 24, 2003

Related U.S. Application Data

(60) Provisional application No. 60/323,079, filed on Sep. 19, 2001.

(51) Int. Cl.[7] .................. F16K 21/04; B01D 35/153
(52) U.S. Cl. ............... 137/533.25; 210/117; 210/136
(58) Field of Search .................. 210/110, 117, 210/136, 168, 171, 172, 416.5, 418, 445; 137/533.21, 533.25; 251/364; 184/6.24; 475/127, 159

(56) References Cited

U.S. PATENT DOCUMENTS

| | | | | |
|---|---|---|---|---|
| 758,377 A | * | 4/1904 | Miller | 137/454.4 |
| 1,247,533 A | * | 11/1917 | Heath | 210/136 |
| 1,868,055 A | * | 7/1932 | Edwards | 184/6.24 |
| 4,185,655 A | * | 1/1980 | Wilkes et al. | 137/315.33 |
| 4,297,580 A | * | 10/1981 | Juner et al. | 250/368 |
| 2002/0179507 A1 | * | 12/2002 | Wolford et al. | 210/130 |
| 2003/0040391 A1 | * | 2/2003 | Heath et al. | 475/159 |

* cited by examiner

Primary Examiner—Matthew O. Savage
(74) Attorney, Agent, or Firm—Baker & Hostetler, LLP

(57) ABSTRACT

An anti-drainback apparatus for a filter used in a vehicle transmission, allows fluid to keep the transmission pump primed when the engine is turned off. In one embodiment, the apparatus includes a seal disposed in a neck member of the filter at its outlet, and a body having slanted sides, and a platform base. The body is disposed in the neck member such that the slanted sides of the body abut the seal, and the platform base covers the opening of the neck member, preventing fluid from draining back from the pump into the sump when the engine is turned off. Thus, the body is movable from an unsealed position which allows fluid flow to the transmission when the engine is turned on, and the sealed position which prevents fluid drainback into the filter when the engine is turned off.

17 Claims, 6 Drawing Sheets

RECIPROCATING CONE ANTI-DRAINBACK APPARATUS

PRIORITY

This application claims priority to the Provisional U.S. Patent Application No. 60,323,079 entitled, RECIPROCATING CONE ANTI-DRAINBACK APPARATUS, filed Sep. 19, 2001, in the name of James B. Wolford et al., disclosure of which is hereby incorporated by reference.

BACKGROUND OF THE INVENTION

1. Field of the Invention

The present invention relates to a reciprocating cone anti-drainback apparatus for a filter used in a vehicle, which allows the transmission pump to remain primed with fluid and not have the fluid drained back through the filter, when the transmission is turned off.

2. Description of the Related Art

Transmission fluid in vehicles with automatic transmissions, is circulated through a filter to remove particles that may damage mechanical components of the transmission. When the vehicle engine is turned off, transmission fluid drains from the transmission pump via the filter, into the transmission sump. When the vehicle engine is turned on, the transmission pump is full of air, and it must evacuate this air to pull fluid upward from the filter, into the transmission pump. The transmission pump is not designed to have air flow through it, since its function is to create hydraulic pressure. Therefore, when the engine is turned on again, it takes time before the transmission fluid is pumped back into the transmission pump, causing noise and delay before the transmission pump is filled with oil at the appropriate pressure, and the vehicle is able to move.

In order to prevent the fluid from draining from the transmission pump into the filter after engine shutdown, a valve is implemented. This type of conventional valve is disposed at a predetermined location within the filter outlet and does not move in a vertical manner within the filter outlet. Rather, the conventional valve has a conical shape with sides that collapse to allow fluid to pass from the filter to the transmission pump when the engine is turned off, but whose sides move outwards to seal against the filter outlet's wall to prevent fluid from draining back into the filter. However, the conventional valve is subject to wear, causing the valve to crack and/or lock in the collapsed position, preventing the valve from sealing against the filter outlet's walls and allowing fluid to drain back into the filter. Alternatively, the conventional valve may employ components such as a sphere and spring to prevent flow of fluid back into the filter. As previously described, the aforementioned valve is subject to wear which in turn may cause the individual components of the valve to fail. In addition, the use of multiple components increases both the assembly cost and the difficulty of assembly.

Accordingly, it is desirable to provide a valve for keeping the transmission pump primed with fluid when the engine is turned off, so that when the engine is turned on again, the transmission pump will not cause noise and delay. It is also desirable to provide a valve that employs minimal components, resulting in ease of assembly, reduced assembly cost and greater valve life.

SUMMARY OF THE INVENTION

The object of the present invention is to identify a way to keep a vehicle transmission primed by keeping fluid in the pump when the engine is turned off.

The present invention comprises an anti-drainback apparatus for a filter used in a vehicle engine. In one embodiment of the present invention, the anti-drainback apparatus includes a neck member disposed at an outlet of the filter, the neck member having a seal disposed within the neck member and around an internal periphery thereof, and a reciprocating cone or conical body which is disposed in the neck member of the filter. The conical body is movable to either abut and seal with the neck member to prevent fluid from passing downward through the neck member and draining back into the filter, or unseal from the neck member and allow fluid to pass through the neck member and exit the filter.

Specifically, the conical body includes a top opening, slanted sides, and a platform base, the platform base having installation tabs attached thereto. The installation tabs are inserted into a central opening of a support rib which is disposed in the opening of the neck member. The support rib spans the opening and allows fluid to pass therethrough. The installation tabs have an outer ribbed portion (i.e., stop ribs) at the base thereof, the outer ribbed portions which abut the central opening of the support rib at an underside periphery thereof, to prevent the installation tabs from being removed from the central opening once the installations tabs are inserted in the support rib.

Therefore, when the engine is turned on and a vacuum is applied to the filter, the platform base of the conical body lifts to uncover the opening of the neck member, the slanted sides of the conical body unseal from the seal disposed in the neck member, allowing fluid to pass through the opening of the neck member, around and through cutouts in the slanted sides of the conical body and upward into the transmission. The conical body is retained in the neck member by the abutment of the outer ribbed portions of the installation tabs against the underside of the support rib at the periphery of the central opening.

When the engine is turned off, the vacuum is removed, and the conical body slides downward in the neck member and returns to a sealing position with the slanted sides of the conical body abutting against the seal, and the platform base covering the opening of the neck member. Thus, the fluid in the pump does not drain back down into the filter.

Accordingly, fluid is held in transmission pump after engine shutdown thereby reducing the time required for the transmission to reach operating pressure and minimizing start-up.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Other features and advantages of the invention will be apparent from the following description taken in connection with the accompanying drawings, wherein.

DETAILED DESCRIPTION OF THE PREFERRED EMBODIMENTS

The present invention relates to an anti-drainback apparatus for a filter used in a vehicle transmission. In one embodiment, the anti-drainback apparatus (see FIG. 1) allows the transmission pump to remain primed so that there is no transmission whine and delay while fluid is pulled back into the pump, when the engine is turned on.

Figure 8:
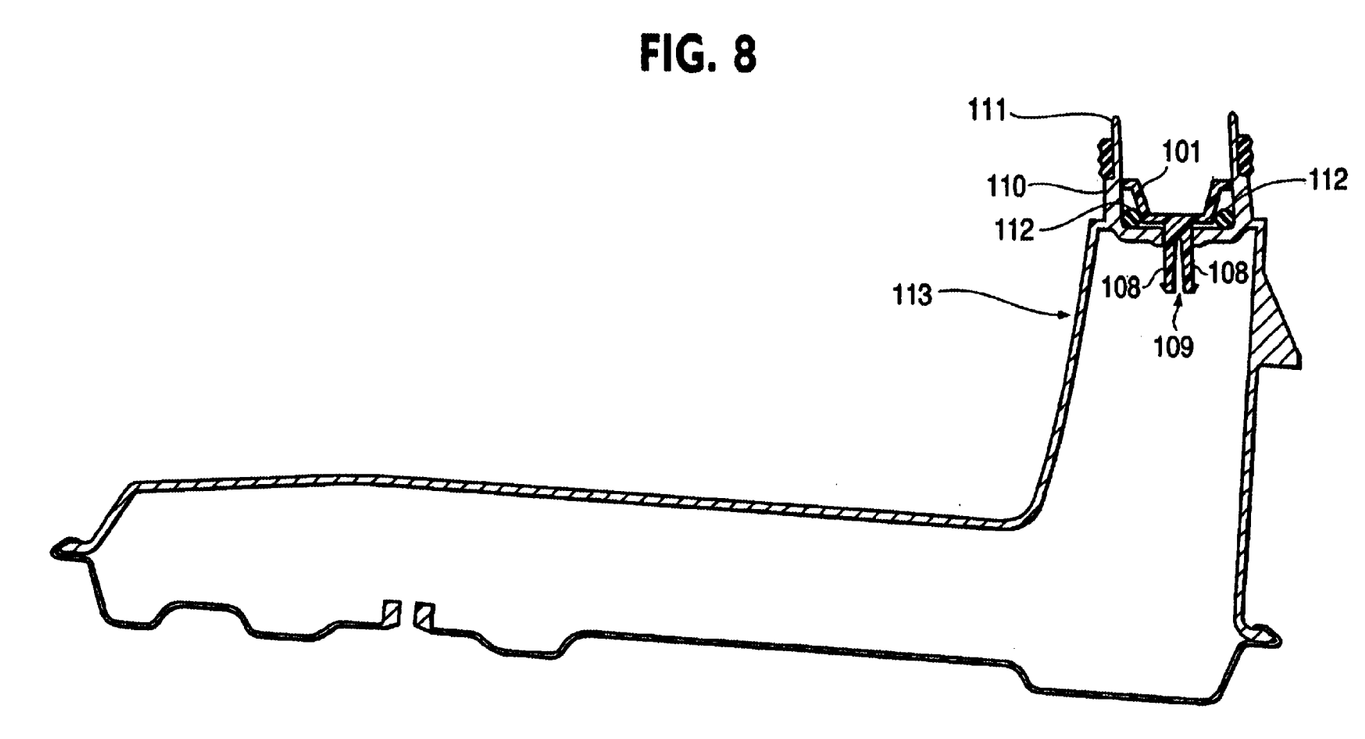

In a first embodiment, the anti-drainback apparatus 100 (see FIG. 1) includes a preferably reciprocating cone or conically-shaped body 101, made of one of plastic (FIG. 8), metal, and plastic composite (not shown), in this embodiment made of metal. However, the member 101 need not be conical, but could be spherical 118 (see FIG. 2a) or hemispherical 119 (FIG. 2b) in shape, in another embodiment.

Figure 1:
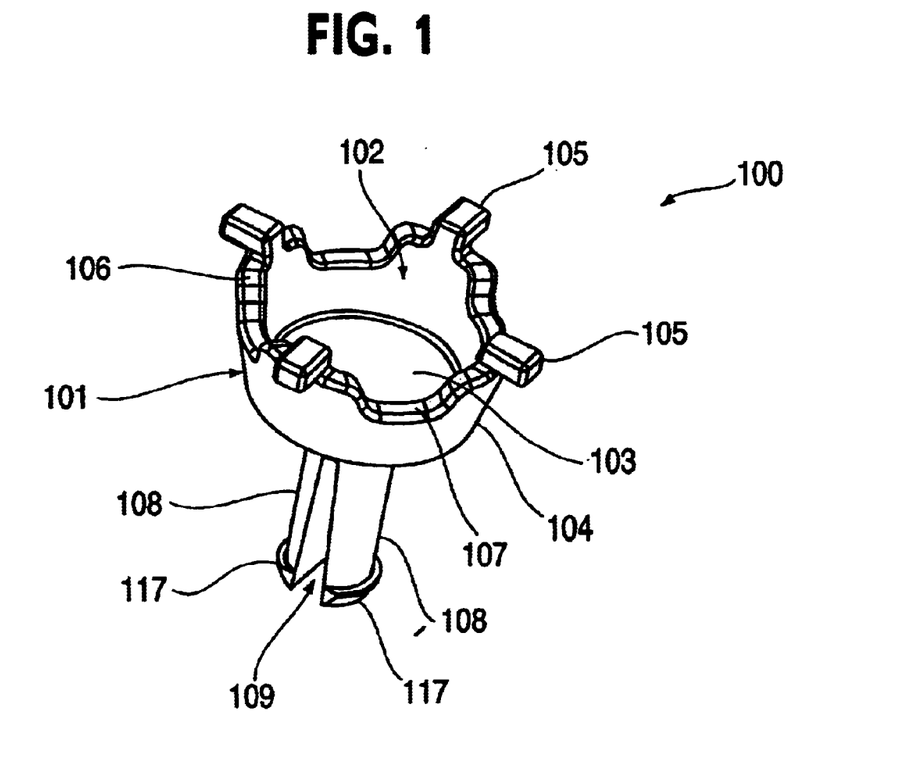
FIG. 1 shows a perspective view of the anti-drainback apparatus according to one embodiment of the present invention.
Figure 2A:
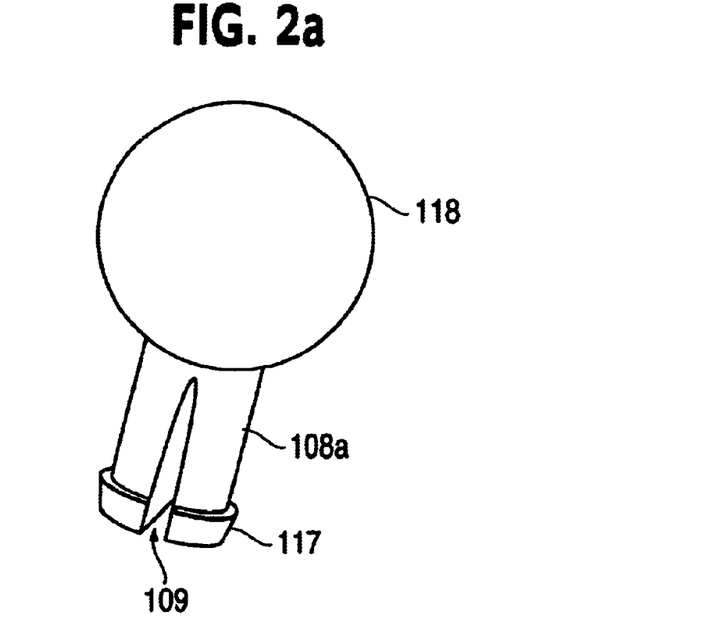
FIG. 2a shows a perspective view of the anti-drainback apparatus according to another embodiment of the present invention.
Figure 2B:
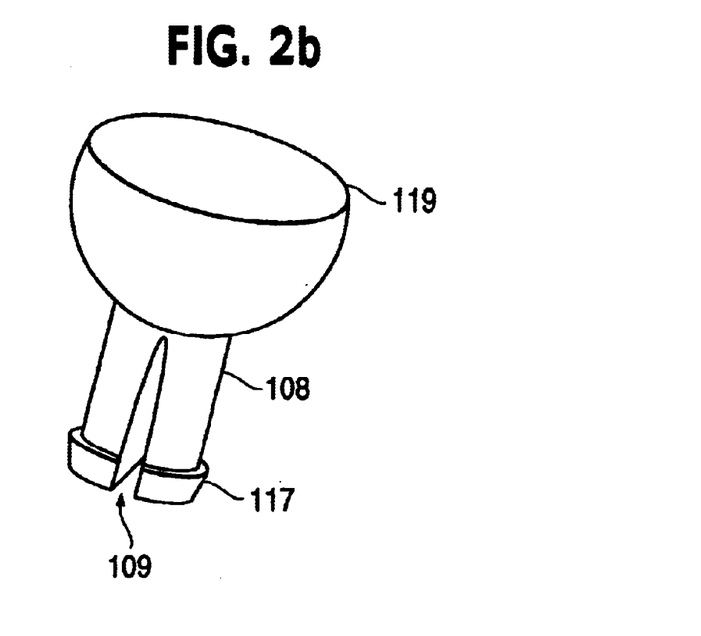
FIG. 2b shows a perspective view of the anti-drainback apparatus according to yet another embodiment of the present invention.

The anti-drainback apparatus 100 may have a top opening 102 at one end, and a platform base 103 at another end, and slanted sides 104 which narrow inward from the top opening 102 toward the platform base 103. However, the top opening 102 is not necessary, and the top of the body 101 could be closed.

The body 101 also includes a plurality of locating tabs 105 disposed around an outer peripheral surface—in this embodiment an undulating outer peripheral surface 106—of the top opening 102 of the body 101. The undulating outer peripheral surface 106 forms cutouts 107 in the slanted sides 104 of the body 101.

A plurality of installation tabs 108 (see FIGS. 1, 2a, and 2b) are disposed below and attached to the platform base 103 either by being integrally formed therewith, or adhered to the platform base 103 by adhering means (i.e., ultrasonic welding, adhesive etc.). The installation tabs 108 are essentially a cylindrical-shaped body divided into two equal halves 108 and separated by a space 109 therebetween. However, the installation tabs 108 need not be entirely separated into equal halves, and can be closed at the top portion of the tabs 108a (see FIG. 2a).

In the first embodiment shown in FIG. 1, the space 109 increases in a direction away from the platform base 103 such that the installation tabs 108 spread outward in an inverted conical shape away from the platform base 103 of the body 101. However, it is not necessary that the space 109 increase and the dimension could remain the same in the direction away from the platform base 103.

The body 101 is inserted into the neck member 110 (see FIG. 3) of the filter outlet 111, and the slanted sides 104 of the body 101 abut a seal 112 which is disposed within the neck member 110 and around an internal periphery thereof. The seal 112 used is either a rubber o-ring 130 (see FIG. 8) or a rubber multi-lobed seal 132 (see FIG. 3) with a metal carrier. When the body 101 is in place in the neck member 110, it forms a seal with the seal 112 of the neck member 110, such that fluid cannot drain back through the neck member back into the filter 113. The body 101 in combination with the seal 112 comprise a sealing means which form drainback prevention means.

Figure 4:
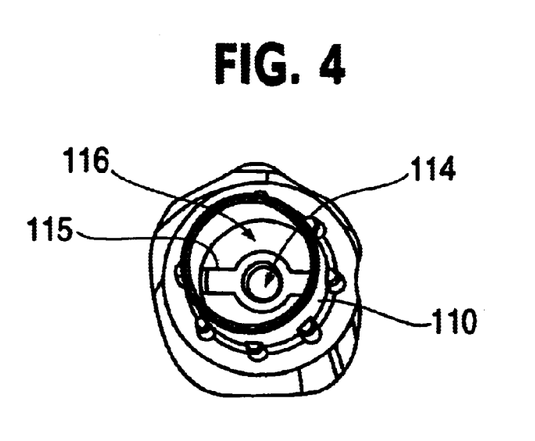
FIG. 4 shows a perspective view of the internal structure of the neck member of the filter according to the embodiment of the present invention shown in FIG. 1.

Specifically, the installation tabs 108 of the body 101 are inserted into a central opening 114 (see FIG. 4) of support rib 115 which is disposed in the opening 116 of the neck member 110. The support rib 115 spans the opening 116 and allows fluid to pass therethrough. The installation tabs 108 have an outer ribbed portion (i.e., stop ribs) 117 (see FIGS. 1, 2a, and 2b) at the base thereof, which form body retaining means, the outer ribbed portions 117 which abut the central opening 116 of the support rib 115 at an underside periphery thereof, to prevent the installation tabs 108 from being removed from the central opening 116 once the installations tabs 108 are inserted in the support rib 115 (see FIG. 5). The installation tabs 108 are either integrally formed with the body 101 or attached to the body 101 by adhering means (i.e., press fit, snap fit, insert molded, adhesive etc.).

In operation (see FIGS. 1–5), the seal 112 is first inserted into the neck member 110 of the filter 113 at the filter outlet 111, such that the seal 112 is disposed around an internal periphery of the neck member 110. When the body 101 is inserted into the neck member 110, the installation tabs 108 collapse to close the space 109 therebetween, and the installation tabs 108 are inserted into the central opening 114 of the support rib 115 of the neck member 110. Once inserted, the installation tabs 108 spread outward again, forming an inverted conical shape and retaining the body 101 in the neck member 110.

Figure 3:
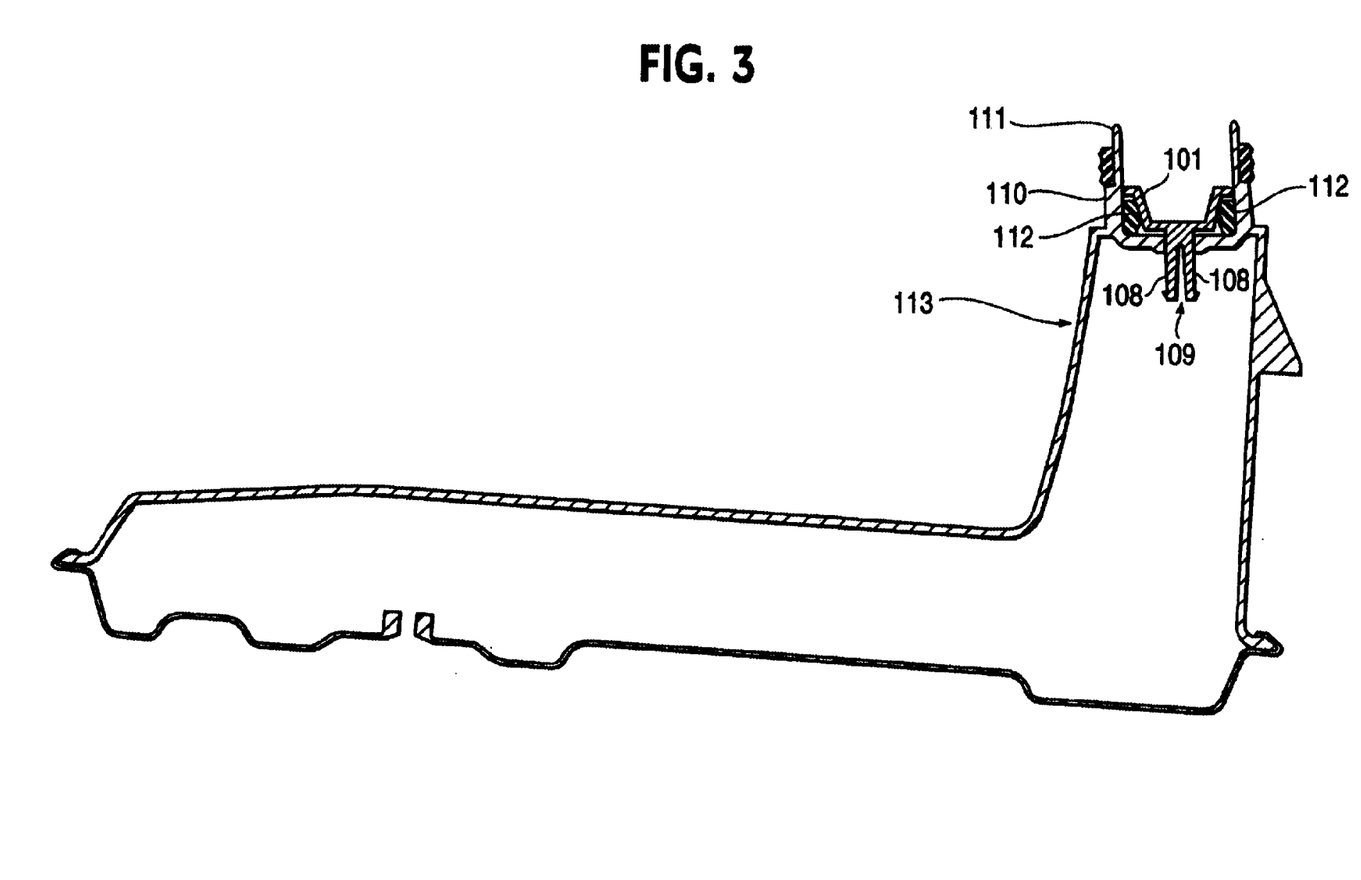
FIG. 3 shows a sectional view of the anti-drainback apparatus disposed in the filter, in a sealed position, according to the embodiment of the present invention shown in FIG. 1.

Upon installation, the body 101 is located such that the slanted sides 104 of the body 101 form a seal with the seal 112 of the neck member 110. The platform base 103 also covers the opening 116 of the neck member 110 to prevent fluid passage therethrough. Further, the locating tabs 105 of the body 101 ensure axial alignment of the body 101 within the neck member 110 of the filter outlet 111.

Figure 5:
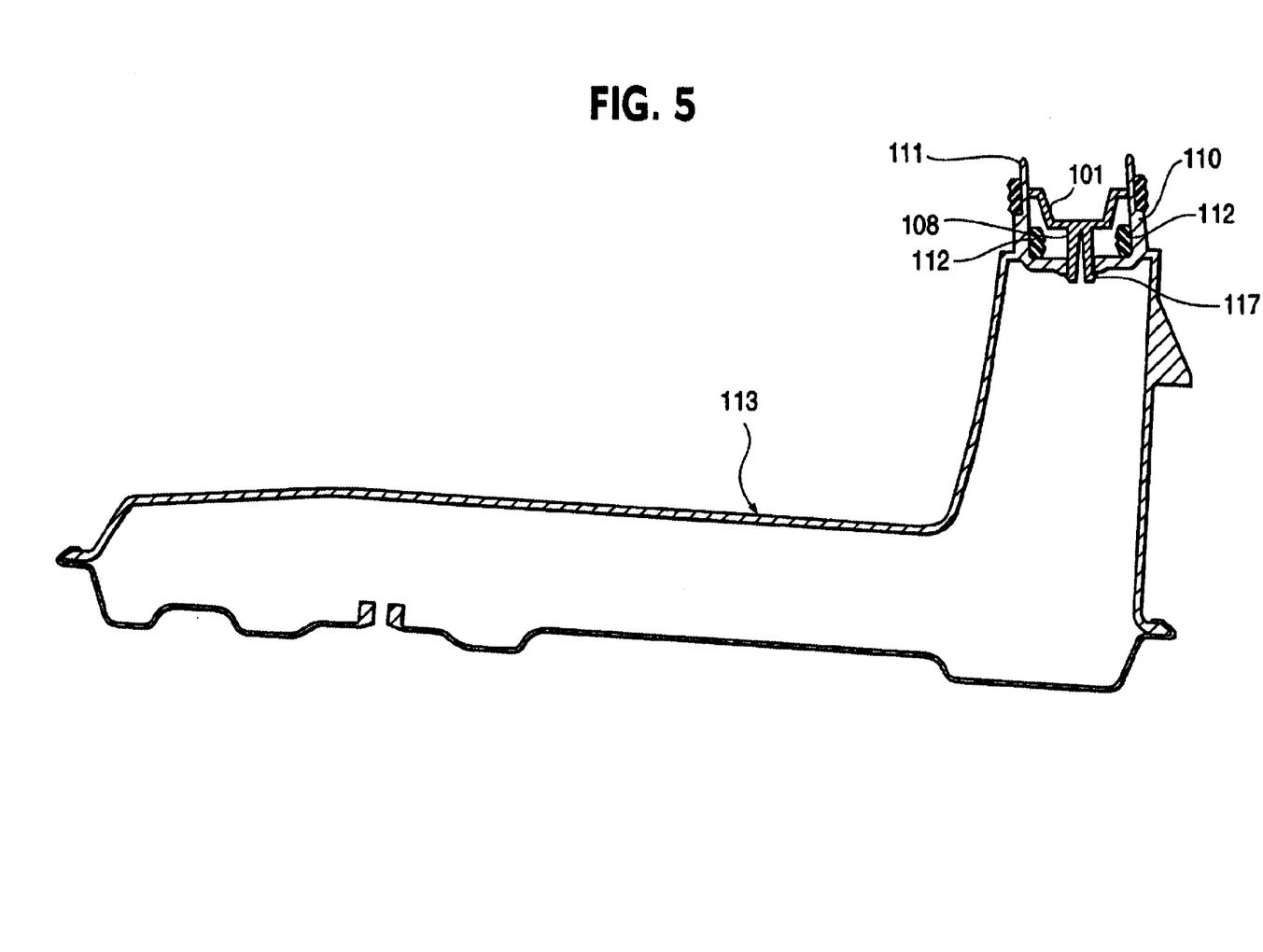
FIG. 5 shows a sectional view of the anti-drainback apparatus disposed in the filter, in an unsealed position, according to the embodiment of the present invention shown in FIG. 1.

When the vehicle engine is turned on and a vacuum is applied to the filter 113, the body 101 is pulled upward, breaking the seal between the slanted sides 104 of the body 101 and the seal 112. The platform base 103 of the body 101 is lifted from covering the opening 116 of the neck member 110. Fluid is then allowed to flow upward through the opening 116 of the neck member 110, around the support rib 115, and through cutouts 107, to exit the filter 113 at filter outlet 111 and pass into the transmission. The body 101 is retained in the neck member 110 when the vacuum is applied, by the abutment of the outer ribbed portion 117 of the installation tabs 108 against the underside of the periphery of the central opening 116 of the support rib 115. The locating tabs 105 assure axial alignment of the body 101 during its rise within the neck member 110.

When the engine is turned off, and the vacuum is removed from the filter 113, the body 101 slides back downward in the neck member 110 until the platform base 103 covers the opening 116, and the slanted sides 104 of the conical body 101 again press against the seal 112 and form a seal preventing fluid from draining back from the transmission and passing through the neck member 110 into the filter 113. Again, the locating tabs 105 assure axial alignment of the body 101 during this process.

In another embodiment of the present invention, the body 101 can be shaped as a flat circular disk 120 (see FIGS. 6) of a plastic, or another suitable material dense enough to prevent flotation or delayed sealing. The disk 120 has a seal 121, preferably of a rubber or other suitable material, which is disposed beneath the top surface of the disk 120, and which is in contact with the filter outlet 111 to provide a seal and prevent backflow of the fluid from the transmission. The disk 120 has a plurality of installation tabs 108 disposed below and attached to the disk 120 either by being integrally formed therewith, or adhered to the disk 120 by adhering means (i.e., ultrasonic welding, adhesive etc.).

Figure 6:
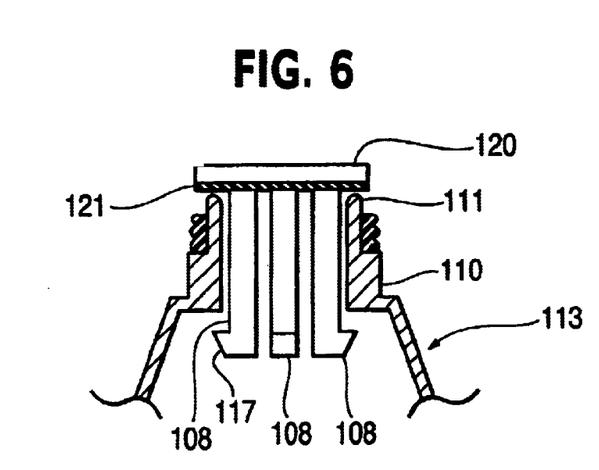
FIG. 6 shows a sectional view of the anti-drainback apparatus according to still another embodiment of the present invention.

In operation, the disk 120 operates similarly to the body 101 of FIG. 1, wherein when the vehicle engine is turned on, the disk 120 is pulled upward, breaking the seal between the disk 120 and the filter outlet 111. Fluid is then allowed to flow upward through the installation tabs 108 and passes into the transmission. The disk 120 is retained in the filter outlet 111 by the abutment of the outer ribbed portion 117 of the installation tabs 108 against the underside of the periphery of the filter outlet 111.

When the engine is turned off, and the vacuum is removed from the filter 113, the disk 120 slides back downward in the filter outlet 111 until the seal 121 presses against the filter outlet 111 and forms a seal preventing fluid from draining back from the transmission and passing into the filter 113.

Figure 7:
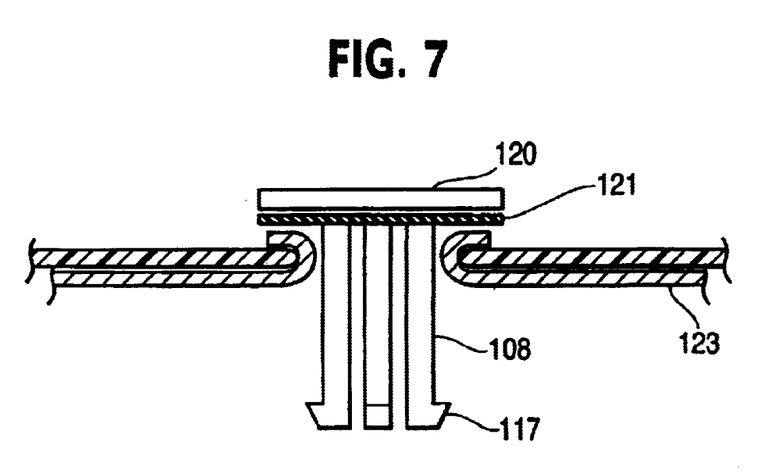
FIGS. 7 and 8 show sectional views of the anti-drainback apparatus according to additional embodiments of the present invention.

However, in another embodiment, the disk 120 or other anti-drainback apparatus 100 need not be used at the filter outlet 111, but can also be used at the filter inlet 123 (see FIG. 7). The filter inlet 123 is larger, and the disposition of the anti-drainback apparatus 125 at the filter inlet 123 would not restrict the flow of fluid as much as the anti-drainback apparatuses 100 do at the filter outlet 111.

Thus, the anti-drainback apparatus 100 allows fluid to prime the pump of a vehicle transmission so that there is no whine or delay when the engine is turned on.

It is contemplated that numerous modifications may be made to the apparatus and procedure of the invention without departing from the spirit and scope of the invention as defined in the following claims.

What is claimed is:

1. An anti-drainback apparatus for a filter used in a vehicle transmission, comprising:
 a neck member disposed at one of an outlet and inlet of the filter; and
 a body disposed in said neck member of the filter, said body which is movable to either one of seal with said neck member and prevent fluid from passing downward through said neck member, and unseal from said neck member and allow fluid to pass through said neck member and exit through the filter outlet, wherein said body is a conical body, and said conical body further comprises:
 a top opening at one end, and a platform base at another end, said conical body having slanted sides which narrow inward from said top opening toward said platform base; and
 a plurality of locating tabs disposed around an outer peripheral surface of said top opening of said conical body.

2. The anti-drainback apparatus of claim 1, further comprising a seal disposed within said neck member and around an internal periphery thereof, such that said body abuts said seal to prevent fluid from passing through said neck member and draining back into the filter.

3. The anti-drainback apparatus of claim 2, wherein said seal is comprised of a rubber o-ring.

4. The anti-drainback apparatus of claim 2, wherein said seal is comprised of a multi-lobed rubber seal.

5. The anti-drainback apparatus of claim 1, said conical body further comprising a plurality of installation tabs disposed below and attached to said platform base of said conical body, said installation tabs which are disposed proximate each other with a space therebetween.

6. The anti-drainback apparatus of claim 5, wherein said neck member has an opening in which a support rib is disposed, said support rib having a central opening therein, said installation tabs which are inserted within said central opening.

7. The anti-drainback apparatus of claim 6, wherein said installation tabs each have an outer ribbed portion at base thereof, said outer ribbed portion which abuts said central opening at a periphery thereof, to prevent said installation tabs from being removed from said central opening of said support rib during use.

8. The anti-drainback apparatus of claim 7, wherein said installation tabs are one of integral with said body.

9. The anti-drainback apparatus according to claim 6, wherein said platform base of said conical body covers said opening of said neck member when said conical body is inserted in said neck member and seals with said neck member.

10. The anti-drainback apparatus of claim 1, wherein said slanted sides of said conical body abuts said seal when said conical body is disposed in said neck member, to seal said neck member and prevent fluid from flowing downward through said neck member and draining back into the filter.

11. The anti-drainback apparatus according to claim 1, wherein said conical body is comprised of one of plastic and metal.

12. The anti-drainback apparatus according to claim 1, wherein said conical body further comprises retaining means for retaining said conical body within said neck member.

13. The anti-drainback apparatus according to claim 12, wherein said retaining means comprises a plurality of installation tabs disposed below and attached to a platform base of said conical body, said installation tabs each having an outer ribbed portion at a base thereof.

14. An anti-drainback apparatus for a filter used in a vehicle transmission, comprising:
 a neck member disposed at one of an inlet and an outlet of the filter; and,
 means for preventing drainback of fluid downward through said neck member, wherein said means for preventing drainback comprises means for sealing said neck member, and further wherein said means for sealing comprises:

a conical body disposed in said neck member of the filter, said concial body having a top opening at one end and a platform base at another end, and having slanted sides which narrow inward from said top opening toward said platform base; and a seal disposed within said neck member and around an internal periphery thereof;

wherein said slanted sides of said conical body abut said seal to prevent fluid from passing downward through said neck member and draining back into the filter.

15. An anti-drainback apparatus for a filter used in a vehicle transmission, comprising:

a neck member disposed at one of an inlet and an outlet of the filter; and, means for preventing drainback of fluid downward through said neck member, wherein said means for preventing drainback comprises:

a body disposed in said neck member off the filter; and a seal disposed within said neck member and around an internal periphery thereof;

wherein said body is movable within said neck member to abut said seal in one position, to prevent fluid from draining backward through said neck member and further wherein said body further comprises:

a top opening at one end, and platform base at another end, and having slanted sides which narrow inward from said top opening toward said platform base;

wherein said slanted sides of said body abut said seal to prevent fluid from passing downward through said neck member and draining back into the filter.

16. The anti-drainback apparatus of claim 15, wherein said conical body further comprises a plurality of locating tabs disposed around an outer peripheral surface of said top opening of said conical body.

17. The anti-drainback apparatus of claim 16, wherein said conical body further comprises a plurality of installation tabs disposed below and attached to said platform base of said conical body, said installation tabs which are disposed proximate each other with a space therebetween.

* * * * *